July 6, 1926.

F. T. WISE

MUD CHAIN

Filed Jan. 13, 1925

1,591,350

Inventor:
Forrest T. Wise

By Clarence O'Brien
Attorney

Patented July 6, 1926.

1,591,350

UNITED STATES PATENT OFFICE.

FORREST T. WISE, OF BURNS, KANSAS.

MUD CHAIN.

Application filed January 13, 1925. Serial No. 2,155.

The present invention relates to a tire chain and has for an object to provide an improved fastener which will function to tighten the chain about the tire, and with which one of the surplus links may be engaged for preventing the fastening device from becoming accidentally unfastened and preventing the surplus links from hitting against the fenders and the like.

In the drawing:—

Figure 1:
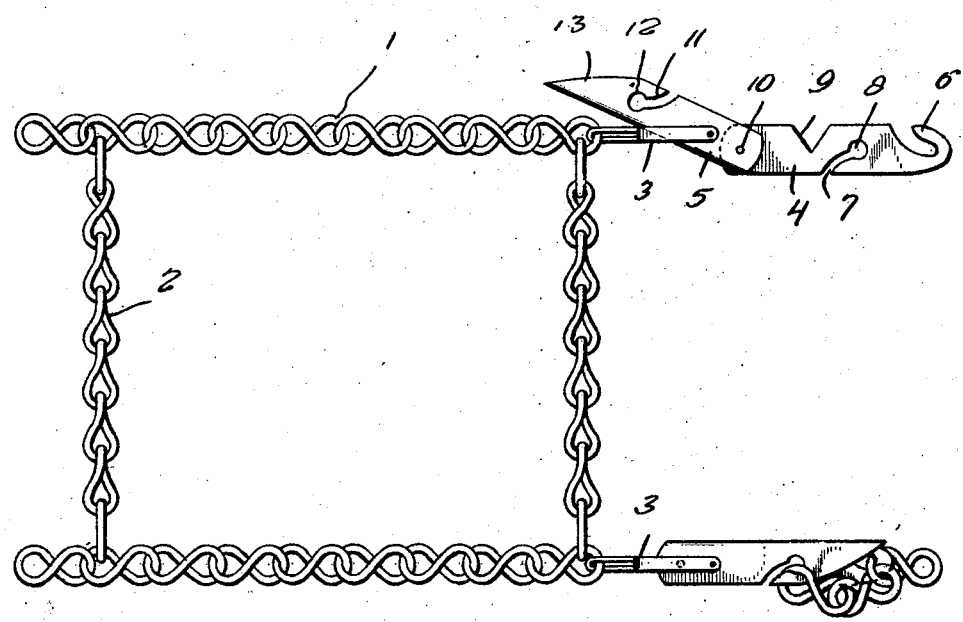
Figure 1 is a fragmentary plan view showing my improved chain.
Figure 2:
Figure 2 is an edge elevation of one of the fastening devices.

Referring to the drawing in detail, it will be seen that the chain illustrated consists of the longitudinal members 1 between which extend the cross members 2. Fastening devices are attached to the end links of the longitudinal members 1, by means of links 3. Each fastening device includes a plate 4, and a channel member 5. The plate 4 is provided at its end with a hook 6, and on its lower end with a diagonally disposed slot 7 entering the opening 8. On the upper edge of the plate 4 there is provided a V-shaped notch 9. The channel member 5 is formed from a plate bent over upon itself along its median dimension and is pivoted to the end of the plate 4 as at 10. The sides of the member are slotted as at 11 beginning from its longitudinal edges and entering openings 12. The free end of the channel member 5 is beveled as at 13.

The free end links of the chain are engaged over the hooks 6, and the channel members 5 are swung from the position shown at the top of Figure 1 to the closed position shown at the bottom of Figure 1 thereby causing the tightening of the chain since the links 3 are pivoted to intermediate portions of the members 5. The surplus links, as is shown at the bottom of Figure 1, may be engaged in the openings 8 and 12, and the natural tendency of the fastener to open will cause a biting engagement of the fastener with the end surplus links so as to prevent its accidental displacement and at the same time the surplus links will prevent the opening of the fastening device.

Having thus described my invention, what I claim as new is:—

A chain fastener and tightener including a plate having one end formed into a hook and provided on one longitudinal edge with a slot entering an intermediately disposed opening offset in relation to said slot, a channel member pivoted to the other end of the plate and having its sides provided with slots extending from its edges and terminating in openings offset in relation to said last-mentioned slots, said last-mentioned slots being adapted to register with the slot of the plate when the channel member is closed over the plate, the free end of the channel member adapted to close over the opening of the hook, and a link pivoted to the channel member intermediate its ends.

FORREST T. WISE.